United States Patent [19]

Fujiwara et al.

[11] Patent Number: 5,037,360
[45] Date of Patent: Aug. 6, 1991

[54] TRANSMISSION BELT

[75] Inventors: Katsuyoshi Fujiwara; Kenji Kusaka, both of Kobe, Japan

[73] Assignee: Bando Chemical Industries, Ltd., Kobe, Japan

[21] Appl. No.: 573,061

[22] Filed: Aug. 24, 1990

[30] Foreign Application Priority Data

Aug. 25, 1989 [JP] Japan .................................. 1-219496

[51] Int. Cl.$^5$ ................................................ F16G 1/08
[52] U.S. Cl. ..................................... 474/202; 474/238; 474/260
[58] Field of Search ............... 474/202, 204, 205, 237, 474/238, 260–262; 524/13; 526/323; 198/780

[56] References Cited

U.S. PATENT DOCUMENTS

| | | | |
|---|---|---|---|
| 4,724,950 | 2/1988 | Okamura | 198/780 |
| 4,833,181 | 5/1989 | Narukawa et al. | 524/13 |
| 4,904,232 | 2/1990 | Kitahama et al. | 474/238 |
| 4,912,186 | 3/1990 | Ohhara et al. | 526/323 |

Primary Examiner—Thuy M. Bui
Attorney, Agent, or Firm—Wenderoth, Lind & Ponack

[57] ABSTRACT

A transmission belt including a part formed by a vulcanized product of a rubber composition comprising 100 parts by weight of chloroprene rubber, 1 to 30 parts by weight of zinc powder and 0.5 to 10 parts by weight of 4,4'-($\alpha,\alpha$-dimethylbenzyl)diphenylamine, and having a high level of dynamic heat resistance and a long life.

7 Claims, 1 Drawing Sheet

TRANSMISSION BELT

BACKGROUND OF THE INVENTION

1. Field of the Invention

This invention relates to a transmission belt. More particularly, it is a transmission belt having a part formed from vulcanized chloroprene rubber.

2. Description of the Prior Art

There is an increasing demand for a transmission belt exhibiting a high level of dynamic heat resistance and having a long life even at a high temperature. For example, a transmission belt installed in an automobile has come to be required to withstand a very high temperature to which it is exposed as a result of a reduction in size of the automobile.

A V-belt, or polyribbed belt is generally required to be capable of withstanding lateral pressure, as it by virtue of a wedge effect transmits power from a driving pulley to a driven one. As the greater part of the lateral pressure bears on the bottom rubber layer of the belt, the layer is required to have a high modulus. The rubber which is used in a toothed, or plain belt is also required to have a sufficiently high modulus for withstanding any shearing force exerted by the pulleys.

If a transmission belt is made by using rubber having a high modulus, however, a large amount of heat is usually generated in the belt when it is bent. This presents a serious problem particularly if the belt is exposed to a high temperature as hereinabove stated. Its temperature becomes so high that it suffers from heavy deterioration by heat during its travel and results in cracking and even breaking soon.

It is known that the use of an appropriate aging inhibitor is important for improving the heat resistance of chloroprene rubber. It is known that p-(p-toluene-sulfonylamide)diphenylamine and p,p'-dioctyldiphenylamine are, for example, effective as aging inhibitors. None of these aging inhibitors, however, exhibits any appreciable effect in improving the dynamic heat resistance of chloroprene rubber, though they may improve its static heat resistance when used in combination with zinc white.

A different method of improving the heat resistance of chloroprene rubber is proposed in the Japanese patent application laid open under No. S 50-87437. The proposed method is characterized by vulcanizing a mixture of chloroprene rubber, phenyl-$\alpha$-naphthylamine as an aging inhibitor, and a zinc powder. The rubber so vulcanized, however, still fails to exhibit any improved dynamic heat resistance, though it may have an improved static heat resistance.

SUMMARY OF THE INVENTION

Under these circumstances, it is an object of this invention to provide a transmission belt including a part formed from chloroprene rubber exhibiting an improved dynamic heat resistance, and having a long life even if exposed to a high temperature.

This object is attained by a transmission belt having a part formed from a vulcanized product of a rubber composition consisting of 100 parts by weight of chloroprene rubber, 1 to 30 parts by weight of zinc powder and 0.5 to 10 parts by weight of 4,4'-($\alpha,\alpha$-dimethylbenzyl)diphenylamine.

More specifically, the vulcanized product forms the bottom rubber layer of a transmission belt which is united with a bonding rubber layer in which tension members are embedded. It greatly improves the oxidation resistance and dynamic heat resistance of the bottom rubber layer and therefore the belt as a whole, and thereby renders the belt durable for a long period of time even in an environment in which a high temperature prevails.

Other features and advantages of this invention will be apparent from the following description and the accompanying drawing.

BRIEF DESCRIPTION OF THE INVENTION

FIG. 1 is a cross-sectional view of a polyribbed belt embodying this invention.

DETAILED DESCRIPTION OF THE INVENTION

Figure 1:
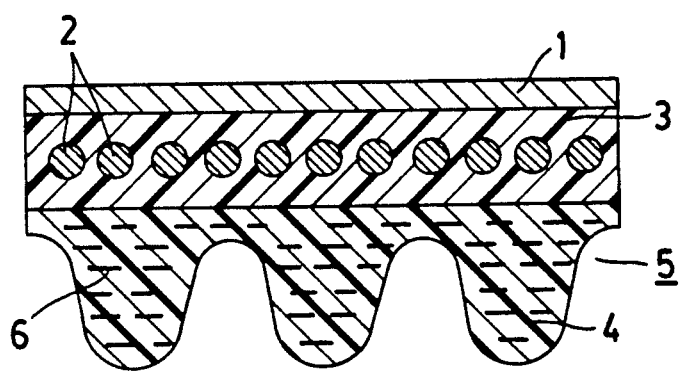

A polyribbed belt embodying this invention is shown in FIG. 1. It comprises a top surface layer 1 formed by one or more plies of rubber-coated canvas, a bottom rubber layer 5 having ribs 4, and a bonding rubber layer 3 disposed between the top surface layer 1 and the bottom rubber layer 5 for joining them together. A plurality of tension members 2 are embedded in the bonding rubber layer 3. Each tension member 2 may, for example, comprise a cord of polyester, polyamide, carbon or glass fiber, or steel having a low degree of elongation. The bottom rubber layer 5 contains short fibers 6 which are distributed throughout it along its width to increase its resistance to lateral pressure.

According to a salient feature of this invention, the bottom rubber layer 5 is formed from a vulcanized product of a rubber composition consisting of 100 parts by weight of chloroprene rubber, 1 to 30, preferably 3 to 15, parts by weight of zinc powder, and 0.5 to 10, preferably 1 to 5, parts by weight of 4,4'-($\alpha,\alpha$-dimethylbenzyl)diphenylamine having the formula:

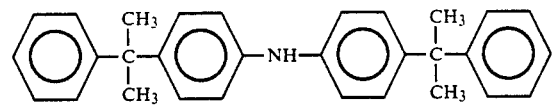

The zinc powder may have a particle diameter of 0.1 to 10 microns. Its preferred particle diameter is in the range of 1 to 5 microns.

The vulcanized product of the chloroprene rubber composition greatly improves the dynamic heat resistance of the lower rubber layer during the movement of the belt, as well as its oxidation resistance. Therefore, the belt exhibits a long life even if it may be exposed to a high temperature.

If the composition contains only less than one part by weight of zinc powder for 100 parts by weight of chloroprene rubber, it does not produce any satisfactory improvement in the dynamic heat resistance of the belt. If it contains more than 30 parts by weight of zinc powder, its scorching takes place so rapidly that its processing is difficult.

If the composition contains only less than 0.5 part by weight of 4,4'-($\alpha,\alpha$-dimethylbenzyl)diphenylamine for 100 parts by weight of chloroprene rubber, it does not achieve any satisfactory improvement in the dynamic heat resistance of the belt irrespective of the use in combination of the zinc powder. If its proportion exceeds 10 parts by weight, it prevents the vulcanization of the rubber and the resulting belt is so low in lateral pressure and shearing force resistance as to break soon.

Although the vulcanized product of the chloroprene rubber composition has been described as forming the bottom rubber layer of the belt, it can also be used to form its bonding rubber layer or the rubber coating the canvas forming its top surface layer. The same is the case with any corresponding part of a V-belt and any rubber coating the canvas forming the bottom surface layer of any such belt. In other words, the term "part" of a belt as herein used for defining the invention not only means its bottom rubber layer, but also covers any such other part as its bonding rubber layer.

The term "part" further includes, for example, the rubber layer of a toothed belt in which tension members are embedded, the rubber coating the canvas covering its teeth, the rubber layer of a plain belt in which tension members are embedded, and the rubber coating the canvas covering its top and/or bottom surface.

The chloroprene rubber composition which is used for making the belt of this invention may further contain not only any vulcanizing or reinforcing agent that an ordinary chloroprene rubber composition usually contains, but also other additives, such as a filler, a softener, a plasticizer, a vulcanizing accelerator, a coloring agent and a lubricant. Examples of these additives include carbon black and silica as the reinforcing agent, light and heavy calcium carbonate as the filler, aromatic, naphthenic and paraffinic oils as the softener, dioctyl phthalate or adipate as the plasticizer, di-o-tolylguanidine dicatechol borate and TMU as the vulcanizing accelerator, red oxide as the coloring agent, and stearic acid as the lubricant.

A known or usual method can be employed for making the transmission belt of this invention. For example, chloroprene rubber and the necessary and desirable additives are kneaded together in a Banbury mixer, and the resulting mixture is rolled by calender rolls to form a rubber sheet in which short fibers are uniformly distributed and equally oriented. The sheet is cut to suit the mold width, and after any necessary canvas and tension members have been laid on the sheet so that the short fibers may be oriented along the belt width, the whole is placed in a vulcanizer and the rubber composition is vulcanized. Then, the vulcanized product is ground into the shape of a belt and cut to the desired width.

The invention will now be described more specifically with reference to a few examples thereof, as well as comparative examples. It is to be understood that the following description is not intended for limiting the scope of this invention.

EXAMPLES

Various chloroprene rubber compositions were each prepared by kneading in a Banbury mixer the materials shown in TABLE 1. Each composition was rolled by calender rolls to form a sheet of unvulcanized rubber in which short nylon-66 fibers having a thickness of 2 D and a length of 6 mm were oriented in a direction corresponding to the width of a belt. The sheet was subjected to 30 minutes of vulcanization at 150° C. to produce a sheet of vulcanized rubber. The properties thereof are shown in TABLE 1.

A polyribbed belt having three ribs and having a length of 975 cm was made by using each unvulcanized rubber composition for its bottom rubber layer. Its dynamic heat resistance was examined by a traveling test. The traveling test was conducted by passing the belt around a driving pulley having a diameter of 120 mm, a driven pulley having a diameter of 120 mm and an idle pulley having a diameter of 45 mm, placing a load of 12 hp on the driven pulley and a set weight (tension) of 85 kgf on the idle pulley, and rotating the driving pulley at a speed of 4900 rpm to cause the belt to travel. The test was conducted in a place having a temperature of 85° C. The belt was kept traveling until its bottom rubber layer cracked, and the time which had passed before such cracking occurred was taken as a measure of the life of the belt. The temperature of the bottom rubber layer was measured at the end of the life of the belt. The results are shown in TABLE 1.

In EXAMPLE 1, the chloroprene rubber composition contained not only 4,4'-($\alpha,\alpha$-dimethylbenzyl)diphenylamine as an aging inhibitor, but also zinc powder, and the vulcanized product thereof formed the bottom rubber layer of a transmission belt according to this invention. The belt exhibited a high degree of dynamic heat resistance and a long life, while its bottom rubber layer was maintained at a low temperature. These results apparently confirm that the zinc powder enables the effective dissipation of heat from the traveling belt and thereby the high dynamic heat resistance of the belt according to this invention.

In COMPARATIVE EXAMPLE 1, the bottom rubber layer of the belt was formed from the vulcanized product of a conventional chloroprene rubber composition containing p,p'-dioctyldiphenylamine as an aging inhibitor. The belt exhibited a low dynamic heat resistance and had, therefore, only a short life.

In COMPARATIVE EXAMPLE 2, the composition did not contain any zinc powder, though it contained the same aging inhibitor as that which had been used in EXAMPLE 1. It yielded only a belt having a short life. Its bottom rubber layer had at the end of its life a temperature which was over 10° C. higher than that as measured in EXAMPLE 1. The same was true of the bottom rubber layer of the belt according to COMPARATIVE EXAMPLE 1.

In COMPARATIVE EXAMPLE 3, the composition contained p,p'-dioctyldiphenylamine and zinc powder, and yielded a belt having a bottom rubber layer which showed at the end of its life even a temperature which was lower than that as measured in EXAMPLE 1. Its life was, however, not a great improvement over the results which had been obtained in COMPARATIVE EXAMPLES 1 and 2.

In COMPARATIVE EXAMPLE 5, the composition contained 4,4'-($\alpha,\alpha$-dimethylbenzyl)diphenylamine and zinc powder, but the use of too large a proportion of the former disabled the satisfactory vulcanization of the rubber. The traveling belt was heavily worn and broke very soon. These results confirm that the excellent results as achieved by the belt of this invention can be achieved only when an appropriate proportion of 4,4'-($\alpha,\alpha$-dimethylbenzyl)diphenylamine is used with zinc powder.

In COMPARATIVE EXAMPLES 6 and 7, conventional aging inhibitors were used with zinc powder, but neither of the belts showed any substantially improved life.

No description is made of any other example or the results thereof, as they are obvious from TABLE 1.

TABLE 1

| | Example 1 | Comparative Example 1 | Comparative Example 2 | Example 2 | Comparative Example 3 | Example 4 | Example 3 | Comparative Example 5 | Comparative Example 6 | Comparative Example 7 | Comparative Example 8 |
|---|---|---|---|---|---|---|---|---|---|---|---|
| Chloroprene rubber composition[1] | | | | | | | | | | | |
| Chloroprene rubber[2] | 100 | 100 | 100 | 100 | 100 | 100 | 100 | 100 | 100 | 100 | 100 |
| Stearic acid | 1 | 1 | 1 | 1 | 1 | 1 | 1 | 1 | 1 | 1 | 1 |
| Magnesia | 4 | 4 | 4 | 4 | 4 | 4 | 4 | 4 | 4 | 4 | 4 |
| Octamine[3] | — | 4 | — | 4 | — | — | — | — | 0.5 | — | — |
| CD[4] | 4 | — | 4 | — | 4 | 4 | 10 | 15 | — | — | — |
| PA[5] | — | — | — | — | — | — | — | — | — | 4 | — |
| 810NA[6] | — | — | — | — | — | — | — | — | — | — | 4 |
| Process oil | 8 | 8 | 8 | 8 | 8 | 8 | 8 | 8 | 8 | 8 | 8 |
| HAF carbon | 35 | 35 | 35 | 35 | 35 | 35 | 35 | 35 | 35 | 35 | 35 |
| Short polyamide fiber | 20 | 20 | 20 | 20 | 20 | 20 | 20 | 20 | 20 | 20 | 20 |
| Zinc white | 5 | 5 | 5 | 5 | 5 | 5 | 5 | 5 | 5 | 5 | 5 |
| Zinc powder[7] | 5 | — | — | 5 | 30 | 40 | 5 | 5 | 1 | 5 | 5 |
| Mooney scorch time of unvulcanized rubber[8] | 12'13" | >30' | >30' | 12'10" | 1'30" | 0'15" | 12'15" | 13'00" | >30' | 12'08" | 12'11" |
| Properties of vulcanized rubber | | | | | | | | | | | |
| In parallel to grain direction: | | | | | | | | | | | |
| 10% modulus (kg/cm$^2$) | 56 | 54 | 55 | 55 | 54 | 50 | 21 | 8 | 55 | 54 | 55 |
| Stress of rupture (kg/cm$^2$) | 110 | 92 | 103 | 115 | 102 | 95 | 92 | 41 | 101 | 104 | 101 |
| Elongation at rupture (%) | 280 | 260 | 230 | 270 | 240 | 270 | 370 | 510 | 260 | 250 | 260 |
| At right angles to grain direction: | | | | | | | | | | | |
| Hardness (deg.) | 86 | 86 | 85 | 86 | 86 | 86 | 85 | 79 | 86 | 85 | 86 |
| Stress at rupture (kg/cm$^2$) | 105 | 100 | 103 | 105 | 106 | 104 | 100 | 42 | 101 | 107 | 101 |
| Elongation at rupture (%) | 288 | 270 | 272 | 291 | 289 | 291 | 360 | 472 | 275 | 282 | 275 |
| Tensile test after heat aging: | | | | | | | | | | | |
| Change in hardness (deg.) | +6 | +11 | +10 | +9 | +6 | +6 | +5 | +3 | +8 | +9 | +8 |
| Change in stress at rupture (%) | +5 | +6 | +1 | +3 | +10 | ±0 | +1 | +1 | +3 | +3 | +3 |
| Change in elongation at rupture (%) | −44 | −52 | −50 | −47 | −46 | −45 | −41 | −43 | −46 | −48 | −46 |
| Dynamic heat resistance of traveling belt | | | | | | | | | | | |
| Life of bottom rubber layer which ended by cracking, unless otherwise noted (hr) | 643 | 251 | 246 | 325 | 660 | Processing impossible | 552[9] | 45[9] | 470 | 325 | 470 |
| Temp. of bottom rubber layer (°C.) | 114 | 125 | 126 | 113 | 110 | | 115[9] | 116[9] | 118 | 114 | 118 |

Notes:
[1] Parts by weight.
[2] Neoprene GRT.
[3] p,p'-dioctyldiphenylamine.
[4] 4,4'-(α,α-dimethylbenzyl)diphenylamine.
[5] Phenyl-α-naphthylamine.
[6] N-isopropyl-N'-phenyl-p-phenylenediamine.
[7] Zinc powder UF having a particle diameter of 1 to 5 μm.
[8] JIS K 6300, MS 125° C.

What is claimed is:

1. A transmission belt including a part formed by a vulcanized product of a rubber composition comprising 100 parts by weight of chloroprene rubber, 1 to 30 parts by weight of zinc powder and 0.5 to 10 parts by weight of 4,4'-(α,α-dimethylbenzyl)diphenylamine.

2. In a transmission belt comprising a top surface layer, a bottom rubber layer, and a bonding rubber layer which is disposed between said top surface layer and said bottom rubber layer, and in which tension members are embedded, the improvement wherein said bottom rubber layer is formed by a vulcanized product of a rubber composition comprising 100 parts by weight of chloroprene rubber, 1 to 30 parts by weight of zinc powder and 0.5 to 10 parts by weight of 4,4'-(α,α-dimethylbenzyl)diphenylamine.

3. A transmission belt as set forth in claim 2, wherein said composition comprises 100 parts by weight of chloroprene rubber, 3 to 15 parts by weight of zinc powder and 1 to 5 parts by weight of 4,4'-(α,α-dimethylbenzyl)diphenylamine.

4. A transmission belt as set forth in claim 2 or 3, wherein said bottom rubber layer has a plurality of ribs extending longitudinally of the belt.

5. A transmission belt as set forth in claim 4, wherein said zinc powder has a particle diameter of 0.1 to 10 microns.

6. A transmission belt as set forth in claim 5, wherein said diameter is from one to five microns.

7. A rubber composition comprising:
100 parts by weight of chloroprene rubber;
1 to 30 parts by weight of zinc powder; and
0.5 to 10 parts by weight of 4,4'-(α,α-dimethylbenzyl)diphenylamine.

* * * * *